(12) United States Patent
Agrawal et al.

(10) Patent No.: US 6,633,885 B1
(45) Date of Patent: Oct. 14, 2003

(54) SYSTEM AND METHOD FOR WEB-BASED QUERYING

(75) Inventors: Rakesh Agrawal, San Jose, CA (US); John Christopher Shafer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,257

(22) Filed: Jan. 4, 2000

(51) Int. Cl.[7] .............................................. G06F 17/30

(52) U.S. Cl. ............................. 707/102; 707/3; 707/5; 705/1; 345/764

(58) Field of Search .............................. 707/2, 3, 6, 10, 707/103 R, 501.1, 503, 513, 5, 102; 345/833, 764; 705/1

(56) References Cited

U.S. PATENT DOCUMENTS

| | | | | |
|---|---|---|---|---|
| 5,032,989 A | * | 7/1991 | Tornetta | 345/667 |
| 5,361,201 A | * | 11/1994 | Jost et al. | 705/35 |
| 5,473,746 A | * | 12/1995 | Pritt et al. | 345/784 |
| 5,615,347 A | * | 3/1997 | Davis et al. | 345/833 |
| 5,794,216 A | * | 8/1998 | Brown | 705/27 |
| 5,828,374 A | * | 10/1998 | Coleman et al. | 345/786 |
| 5,841,437 A | * | 11/1998 | Fishkin et al. | 345/619 |
| 5,983,220 A | * | 11/1999 | Schmitt | 707/5 |
| 6,282,547 B1 | * | 8/2001 | Hirsch | 707/102 |

OTHER PUBLICATIONS

Spenke, Michael et al., "Focus: the Interactive Table for Product Comparison and Selection", Proceedings of the ACM Symposium on User Interface Software and Technology, 1996, Pp. 41–50.*

Williamson, Christopher et al., "The Dynamic HomeFinder: Evaluating Dynamic Queries in a Real–Estate Information Exploration System", Annual ACM Conference on Research and Development in Information Retrieval, 1992, Pp. 338–346.*

Ahlberg, Christopher et al., "Visual Information Seeking: Tight Coupling of Dynamic Query Filters with Starfield Displays", 1994 ACM, Pp. 313–317 and 479–480.*

Publication: "Dynamic Queries for Information Exploration: An Implementation and Evaluation." Ahlberg et al. ACM CHI 1992 conference. Pp. 619–626, May 1992.

Publication: "Case–Based Reasoning Support for Online Catalog Sales." Vollrath et al. IEEE Internet Computing. Jul.–Aug. 1998, Pp. 47–54.

White Paper: "Focus: The Interactive Table for Product Comparison and Selection." Spenke et al. Pp. 1–13. Aug. 3, 1998.

Publication: "Visual Information Seeking: Tight Coupling of Dynamic Query Filters with Starfield Displays." Ahlberg et al. ACM CHI 1994 conference. Pp. 313–317. Apr., 1994.

* cited by examiner

*Primary Examiner*—Shahid Al Alam
(74) *Attorney, Agent, or Firm*—John L. Rogitz

(57) ABSTRACT

A system and method for exporing a web-accessible database includes providing a GUI that a user can manipulate to quickly modify the results of a query to expand or contract the results set, without requiring additional querying. Attribute controls can be manipulated to impose restrictions on the results set, including by designating example records the attributes of which are used to restrict the records displayed to the user. Only records that can be displayed are instantiated, to further increase the speed of the system.

4 Claims, 8 Drawing Sheets

STATE CHANGE FLOW-NUMERIC RESTRICTIONS

| Manufacturer | Model | Price | Transmission | Cylinders | Horsepower | Weight | 0-60 | Doors | Rank |
|---|---|---|---|---|---|---|---|---|---|
| Suzuki Toyota Volkswagen Volvo | XJS XK8 YUKON Z3 | $7,095 $150,000 | Automatic Manual | 3 12 | 52 424 | 1,650 5,694 | 4 18 | 2 4 | |
| 1,749 Mazda | MX-5 | $19,125 | Manual | 4 | 133 | 2,293 | 9 | 2 | 100.0 |
| 1,705 Mazda | MX-5 | $18,750 | Manual | 4 | 133 | 2,293 | 8 | 2 | 99.8 |
| 1,551 Mazda | MX-5 | $17,895 | Manual | 4 | 128 | 2,293 | 8 | 2 | 98.8 |
| 1,789 Honda | CMC | $19,400 | Manual | 4 | 160 | 2,522 | 8 | 2 | 98.5 |
| 1,826 Honda | DEL | $19,600 | Manual | 4 | 160 | 2,522 | 7 | 2 | 98.3 |
| 1,827 Honda | DEL | $19,600 | Manual | 4 | 160 | 2,522 | 7 | 2 | 98.3 |
| 1,404 Mazda | MX-5 | $17,000 | Manual | 4 | 128 | 2,293 | 9 | 2 | 98.2 |
| 1,726 Toyota | MR2 | $18,948 | Manual | 4 | 135 | 2,590 | 8 | 2 | 98.2 |
| 1,843 Toyota | CELICA | $19,678 | Manual | 4 | 135 | 2,560 | 9 | 2 | 98.0 |
| don't care | don't care | near | near | same | more | near | less | don't care same near more | Rank |
|  |  |  |  |  |  |  |  | less |  |

FIG. 2
SCREEN DISPLAY

DATA STRUCTURE - CATEGORICAL DATACOLUMN (INTERMEDIATE)

DATA STRUCTURE - CATEGORICAL DATACOLUMN (FINAL)

NUMERIC
RESTRICTION
DATA
STRUCTURE

CATEGORICAL RESTRICTION DATA STRUCTURE

STATE CHANGE FLOW-NUMERIC RESTRICTIONS

STATE CHANGE
FLOW-CATEGORICAL
RESTRICTIONS

RENDERING A PRESENTED RESULTS SET

SYSTEM AND METHOD FOR WEB-BASED QUERYING

BACKGROUND OF THE INVENTION

1. Field of the Invention

The present invention relates generally to quickly and efficiently exploring data-centric Web applications.

2. Description of the Related Art

The World Wide Web and other information repositories such as online databases and file servers afford quick access to a large amount of information. Indeed, it has been estimated that 40% of the Web's content originates from databases. As but one example, it might be possible to explore an online database of vehicles by specifying values for particular attributes, e.g., manufacturer, price, engine size, and so on.

Unfortunately, current technology for exploring such databases is relatively primitive, requiring users to input a query to a search engine which then returns a results set that is often too large or too small for the user's purposes. In the context of the above-mentioned vehicle example, for instance, a user might query for vehicles having engines larger than two liters, and in response might be presented a results set listing thousands of vehicles. Or, a user might query for vehicles made by Porsche and costing less than $20000 and be presented with a null set. In any case, it then falls to the user to guess how to tighten or relax the query, and to then undertake the query/response cycle again, potentially many times using the above-described trial and error query refinement.

Furthermore, once results are displayed, no additional exploration features are offered with respect to the results set. And, the query borders are strict—a record falling just outside the query boundaries will not be seen at all by the user. In the context of the above-mentioned vehicle example, for instance, a user might specify a price range of $15000–$20000, with perhaps a vehicle the user might find desirable being priced at $14,999 and thus unfortunately not returned as part of the results set. Still further, a user might happen upon a record returned as part of a query results set that the user finds particularly interesting, but unfortunately cannot use as an example, with current Web database search engines, to query for additional similar records. Fortunately, the present invention has considered the above-noted drawbacks and has provided the below-disclosed solutions.

SUMMARY OF THE INVENTION

A computer is disclosed that is programmed to undertake fast, efficient queries in, e.g., database-centric web applications, although the source of the data can be a local database, a file system, table data from hypertext markup language pages, or indeed any source of attribute-value data records. For illustration purposes, the source of data will be assumed to be a web-accessible database.

The logic executed by the computer includes displaying at least a portion of a set of records from a database. Each record has at least one attribute, and the set of records establishes a results set. For at least one attribute, a respective attribute control is displayed that can be used to specify at least one attribute restriction. When an attribute restriction is received, the results set is modified.

In a preferred embodiment, only records that are to be actually displayed are included during the modifying step. Also, the user can select an example record and the results set modified in response thereto. As envisioned by the present invention, the records can have at least one numeric attribute or at least one categorical attribute.

In another aspect, a graphical user interface (GUI) for querying a database that is accessible via a wide area computer network can include attribute controls which are configured to permit a user to modify a results set generated from a database query without further querying the database. In the preferred GUI, the attribute controls include at least one numeric attribute control and/or at least one categorical attribute control. The attribute controls can be used to establish respective ranges for numerical and categorical attributes to thereby modify a results set. Furthermore, the attribute controls include means for permitting a user to select at least one example from the results set and to modify the results set in accordance with the example. The results set is established by the smallest hypercube that contains all data points of the example. If desired, a rank button can be provided that is manipulable to rank the records in the modified results set and to cause records near but not in the modified results set to be displayed.

In still another aspect, a computer program product includes a program of instructions that have computer readable code means for receiving a results set from a database accessible locally or via a wide area computer network. The results set contains records characterized by attributes. Also, computer readable code means display attribute controls to a user, and computer readable code means alter the results set in response to receiving user input via the attribute controls.

In yet another aspect, a computer-implemented method is disclosed for facilitating database exploration. The method includes receiving a results set from the database including records characterized by attributes, and enabling a user to define at least one attribute restriction. Using only records in the results set, a modified results set is displayed that satisfies the attribute restriction.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a screen display of the user interface of the present invention;

DETAILED DESCRIPTION OF THE PREFERRED EMBODIMENTS

Figure 1:
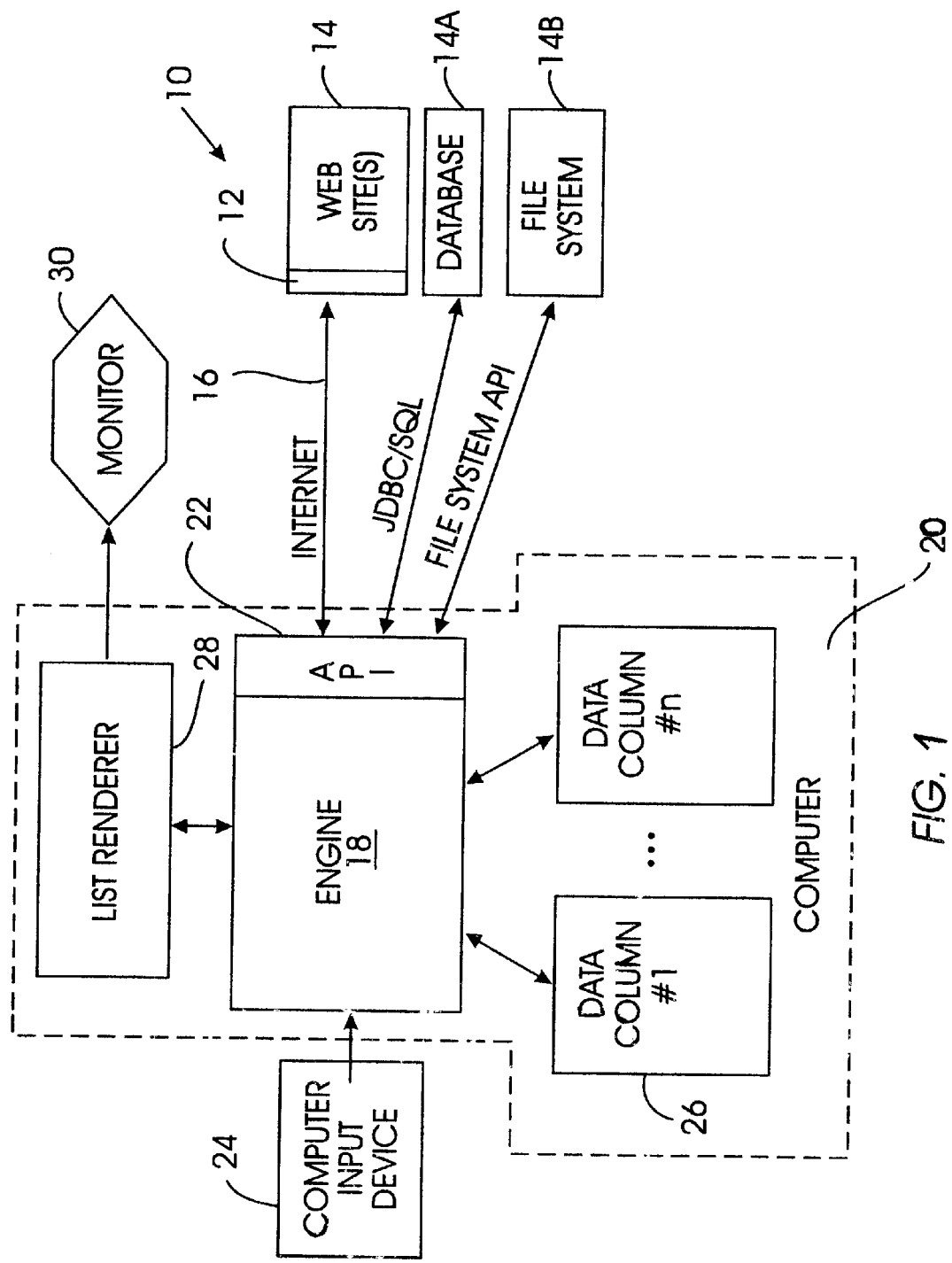
FIG. 1 is a block diagram of the architecture of the present system.

Referring initially to FIG. 1, a system is shown, generally designated 10, for implementing a continuous querying metaphor for exploring data sources, including, without limitation, databases 12 that are associated with wide area computer network components such as web sites 14 via the Internet 16. As shown, the system 10 includes a software-implemented engine 18 that is part of a computer 20 with associated data gathering mechanism, such as data gathering API 22, for communicating with a source of data records, such as the web site 14. As mentioned above, however, the source of the data can be sources other than web-accessible databases. For example, the source of the data can be a database 14A that is accessed using JDBC/SQL, a file system 14B that is accessed using a file system API, table data from hypertext markup language pages, or indeed any source of attribute-value data records. For illustration purposes, however, the source of data will be assumed to be a web-accessible database.

As disclosed in greater detail below, the engine 18 receives continuous query user inputs from an input device 24. The engine 18 cooperates with plural software-implemented data column managers 26, each managing a respective column of attribute data as more fully set forth below, and a software-implemented list renderer 28, which implements, by means of events and explicit application programming interface (API) calls, the graphics user interface (GUI) described below, to display portions of query results sets on a computer output device, such as a monitor 30. Using the GUI, a user can easily and virtually instantaneously expand or contract the results set that is presented to the user, as appropriate for the size of a query result set initially received pursuant to a conventional query of the database 12, without re-querying the database 12.

As intended herein, the computer 20 can be a server computer made by International Business Machines Corporation (IBM) of Armonk, N.Y. Other digital processors, however, may be used, such as personal computers, laptop computers, mainframe computers, palmtop computers, personal assistants, or any other suitable processing apparatus can be used. The input device 24 can be established by one or more of: a computer mouse, keyboards, keypads, trackballs, and voice recognition devices. Output devices other than the monitor 30 can be used, such as printers, other computers or data storage devices, and computer networks.

In any case, the processor of the computer 20 accesses the engine 18, list renderer 28, and data column managers 26 to undertake the logic of the present invention, which may be executed by a processor as a series of computer-executable instructions. The instructions may be contained on a data storage device with a computer readable medium, such as a computer diskette having a computer usable medium with a program of instructions stored thereon. Or, the instructions may be stored on random access memory (RAM) of the computer, on a DASD array, or on magnetic tape, conventional hard disk drive, electronic read-only memory, optical storage device, or other appropriate data storage device. In an illustrative embodiment of the invention, the computer-executable instructions may be lines of C++ code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

FIG. 2 shows a preferred GUI 32 that can be presented on the monitor 30. As shown, the GUI 32 includes a rank button 34 that can be manipulated by means of a mouse for purposes to be shortly disclosed. Also, the GUI 32 includes a list, generally designated 36 in FIG. 2, of records from the database 12. The list 36 can be established by querying the database 12 once, with the list 36 essentially establishing a results set. A results set record size window 38 indicates how many records are in the results set. As intended herein, a user can manipulate the below-described controls to impose attribute restrictions, such that a modified results set satisfying the attribute restrictions is presented.

As recognized herein, while the total size of the underlying database 12 can be huge, the scope of data over which a user performs interactive exploration is relatively small. For example, in web-based product exploration applications, typically only one product category is explored at a time, with an active set of records (i.e., the results set displayed after initial database query) thus numbering in thousands, not millions.

In the example shown, the records are vehicle records, and each record has plural categorical attributes, including make name, model name, and transmission type. Also, in the example shown each record has plural numerical attributes, including price, number of cylinders, horsepower, weight, time to go from zero to sixty miles per hour, and number of doors.

In accordance with the present invention, for at least some, and preferably for all the attributes, corresponding attribute controls 40 are provided. As shown, the attribute controls can include sliders 42 that can be manipulated by means of a mouse or other input device to impose and relax restrictions on the corresponding attributes. For example, the attribute control 42 for the price attribute can be manipulated to specify a price range, and the modified results set that is almost instantly displayed as the attribute control is manipulated is the subset of the original results set that satisfies the restriction, with the record size window 38 being continuously updated to inform the user of whether the results is becoming too restrictive or too large. Likewise, other attribute restrictions can be imposed or relaxed as appropriate by the user by manipulating the attribute controls 40 to easily and virtually instantaneously modify the results set of a query. Categorical attribute controls can be established by select lists that can be manipulated to select or deselect values. Alternatively, attribute restrictions can be controlled by simply responding to a yes or no answer, e.g., "do you want a sporty car?".

Additionally, the records themselves in the list 36 can establish attribute controls. More specifically, a user can click on two or more records to designate the records as being examples, and the modified results set that is displayed is the smallest hypercube that contains all the example data points. Or, a single record can be selected with only one or a few attributes also being selected by highlighting a record, holding down the control key, and using a mouse to click on attribute column headings to indicate example attributes, with the modified results set that is displayed being collapsed around the example attributes.

When an example record is selected and the user clicks the rank button 34, fuzzy query borders can be established.

More specifically, for any given attribute the user can click a fuzzy query button 44 that causes a pop-up menu 46 to be displayed, and using the pop-up menu 46, the user can specify a particular type of fuzzy border. For example, the user can select "near" in which records that are near, but not in, the query region defined by the corresponding example attribute are included in the modified results set with a rank assigned to them. In one intended embodiment, "nearness" is based on a similarity model that computes the weighted sum of normalized differences in attribute values. Thus, records either greater than or less than the specified value within a "nearness" are returned. Likewise, the user can select "same" as the null (no) fuzzy border, in which case only records that lie entirely within the query area are presented. Or, the user can select "more" or "less" to cause records with greater (or lesser) values than the attribute boundary to be displayed.

Figures 3A, 3B:
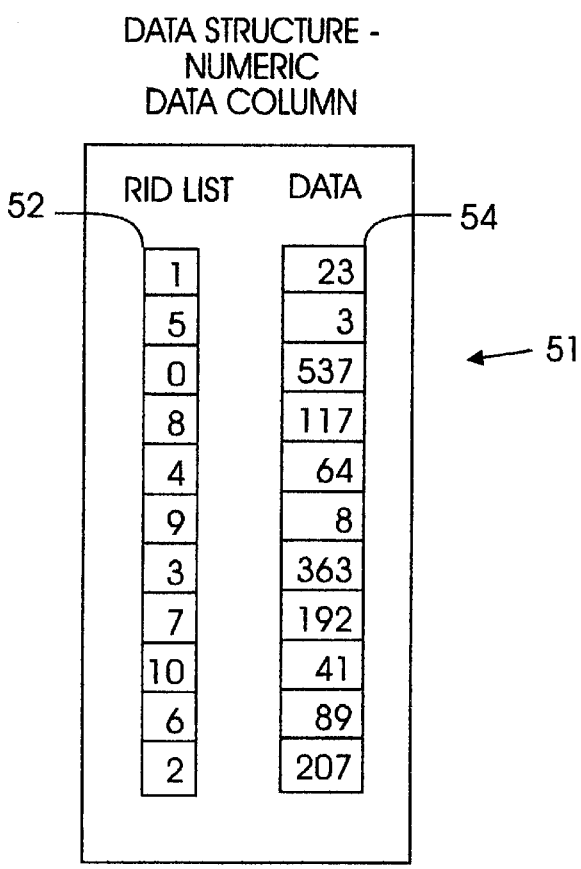
FIG. 3A is a schematic diagram illustrating how rids are assigned to records.
FIG. 3B is a schematic diagram of the data structure of a numeric data column.

Having described the preferred GUI, attention is now directed to the remaining figures to understand the data structures and logic that underlie the functionality set forth above. FIG. 3A shows that as an input stream 48 of records arrives, the records are assigned, in order of arrival, sequential record identifications 50, referred to herein as RIDs, starting from the number 0. In the example shown, the input stream 48 represents car dealerships along with respective distances to each dealership from an origin. The distances in the example shown are the "attributes" for one numeric data column (in the example, a "distance" data column) of a record.

Moving to FIG. 3B, a numeric DataColumn 51 is established by establishing two columns, namely, a RID list column 52 and a data column 54. The RID list column 52 is a list of RIDs sorted in order of corresponding attribute value, from lowest to highest. The RID list column 52 thus represents a precomputed sort of the attributes represented by the DataColumn 51.

As an example, cross-referencing FIGS. 3A and 3B, the dealership shown in FIG. 3A to be associated with RID #1—a Honda dealership—has the lowest attribute value (3) and, hence, RID #1 is the first RID in the RID list 52 of FIG. 3B. In contrast, the dealership shown in FIG. 3A to be associated with RID #2—a Ford dealership—has the highest attribute value (537) and, hence, RID #2 is the last RID in the RID list 52 of FIG. 3B. The data column 54, on the other hand, lists attributes in the original order in which the records arrived in the input stream.

Figure 4:
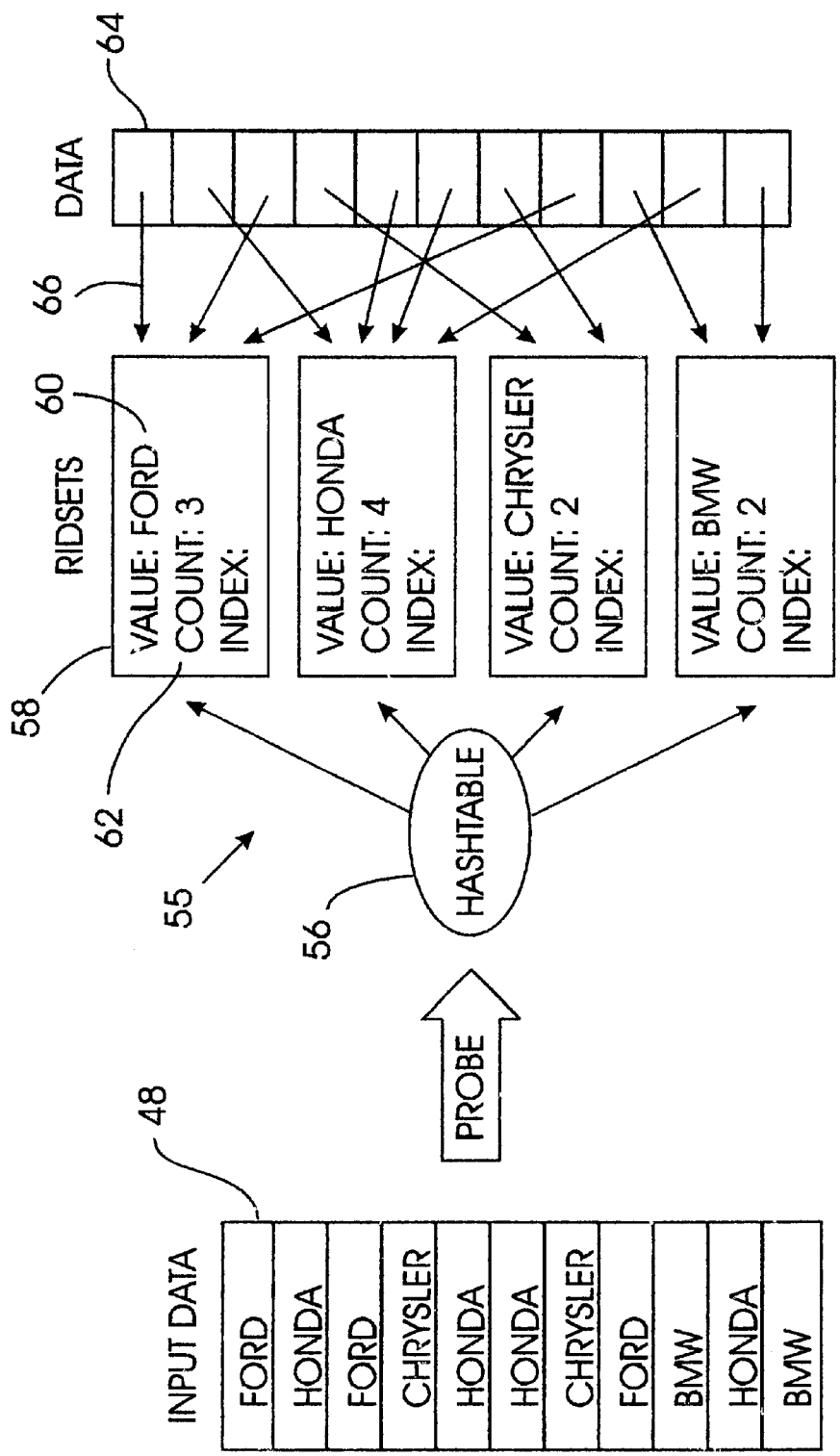
FIG. 4 is a schematic diagram of an interim data structure of a categorical data column.
Figure 5:
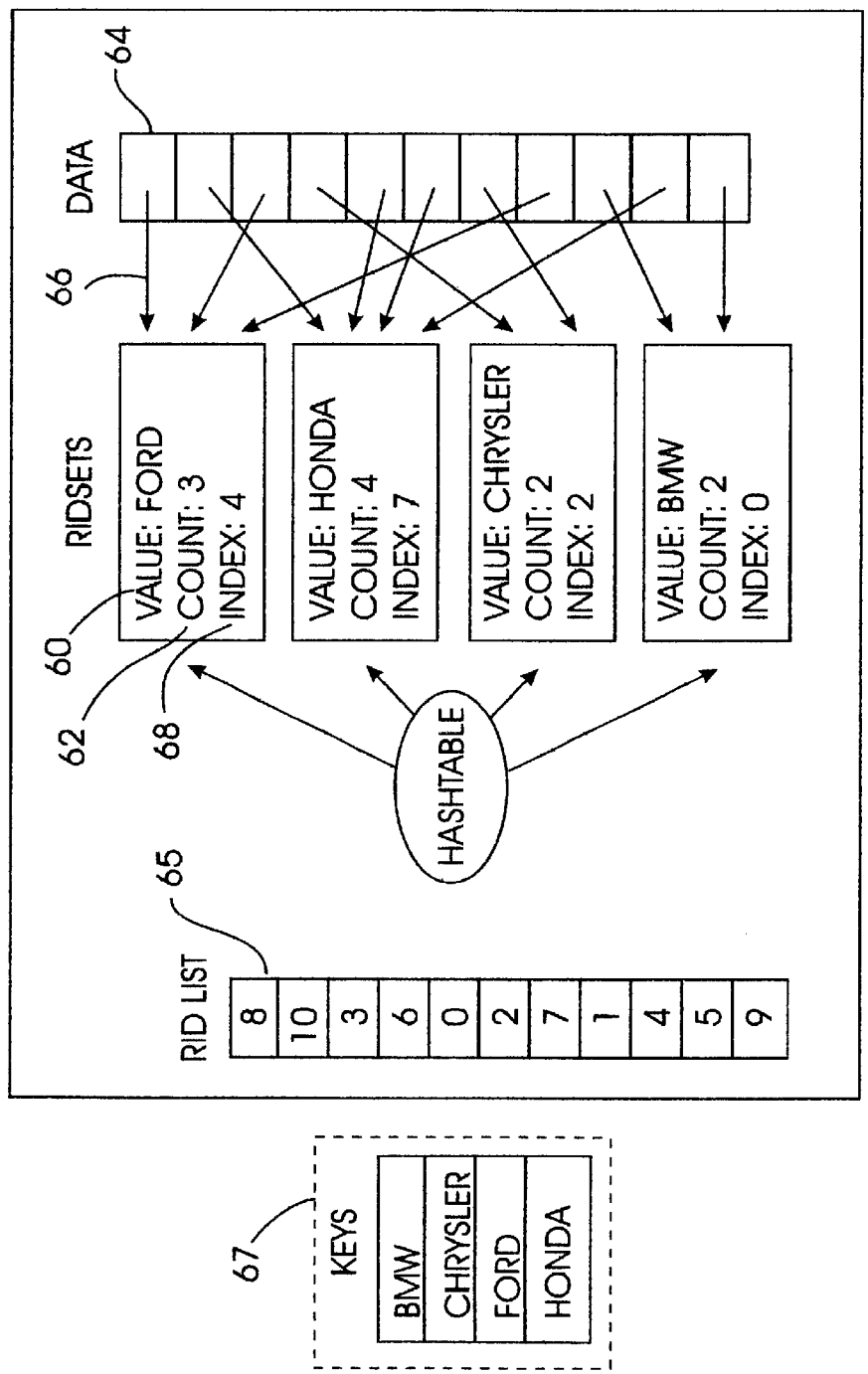
FIG. 5 is a schematic diagram of a final data structure of a categorical data column.

FIGS. 4 and 5 show details of a categorical data column 55 of the present invention. In the example shown, the input data stream 48 is used to probe an initially empty hash table 56. If the probe fails (indicating that the particular categorical value has not yet been used to probe the table 56), a RIDset object 58 is allocated which stores the string value of the categorical value as a RIDset.value 60. Also, a RIDset.count value 62 is initialized with a value of unity. The RIDset 58 is then stored in the hash table 56, indexed by the string value of the RIDset.value 60. Accordingly, like the numerical data array shown in FIGS. 3A and 3B, a categorical data column 55 includes a data array 64 and a RID list 65 (described more fully below in reference to FIG. 5), and in addition includes a hash table 56 and plural RIDsets 58.

If a probe of the hash table 56 does not fail, an existing RIDset 58 will be returned whose RIDset.value 60 is the same as the record being used to probe the table 56. In such a circumstance, the RIDset.count value 62 is incremented by one. In either case, after the hash table 56 has been probed with a record, the record's corresponding entry in the data array 64 is set to point to the appropriate RIDset 58, as indicated by pointers 66 in FIGS. 4 and 5. With the above disclosure in mind, it may now be appreciated that once the scan of the input data is completed, a fully initialized categorical data column 55 is established that has exactly one RIDset object 58 per categorical value, and an initialized data array 64 with pointers 66 to the appropriate RIDset objects 58.

After the initial probe, the RID list 65 of a categorical data column 55 is established as follows. Referring to FIG. 5, rather than sort an entire RID list, each unique string value (referred to herein as a key) is collected and sorted in a separate array 67. In the example shown, four keys are present in the array 67. Then, for each RIDset 58 a respective RIDset.index value 68 is initialized at zero, and then for each key the corresponding RIDset object 58 is retrieved from the hash table 56 and the RIDset.index value 68 is incremented by the value of the RIDset.count value 62, with the RIDset.count value 62 then being set equal to zero. Once the scan is complete, the index value 68 of each RIDset object 58 represents where in the RID list 65 the corresponding RIDs are stored.

A scan of the data array 64 is next commenced. For each RIDset 58 encountered, the corresponding RID is stored at position (RIDset.index value 68+RIDset.count value 62) in the RID list 65. The value of the RIDset.count value 62 is then incremented by one. It is to be understood that the temporary array 67 can be deleted after the RID list 65 is built. To complete the process of establishing a categorical data column 55, the RIDset.count values 62 are restored to the values they had prior to the last-described scan of the data array 64. As intended herein, the various data columns 51, 55 loaded into cache need not originate from a single database table, but could instead be the result of a complex relational expression that defines the scope of the interactive exploration facilitated herein.

Figure 6:
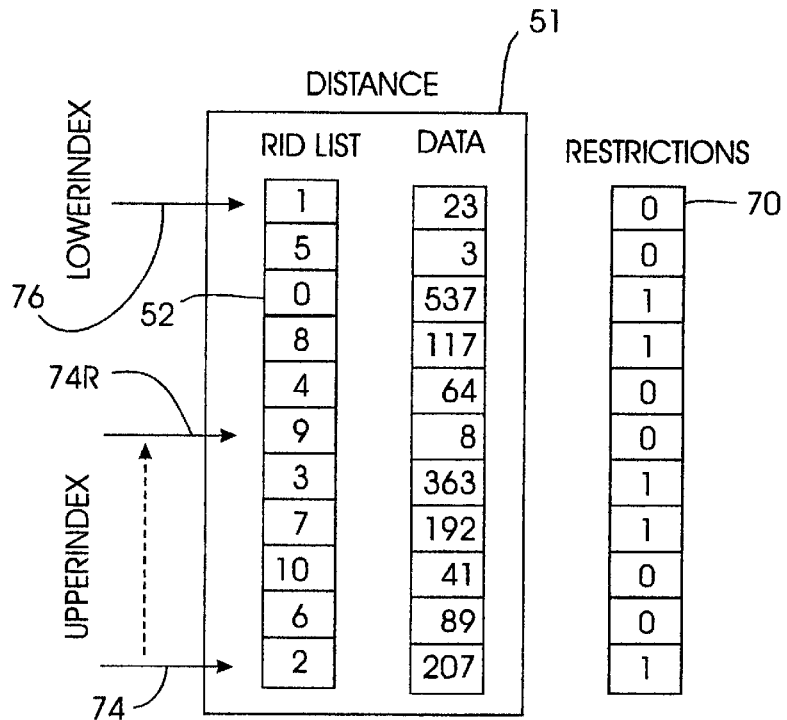
FIG. 6 is a schematic diagram of a numeric restriction data structure.
Figure 7:
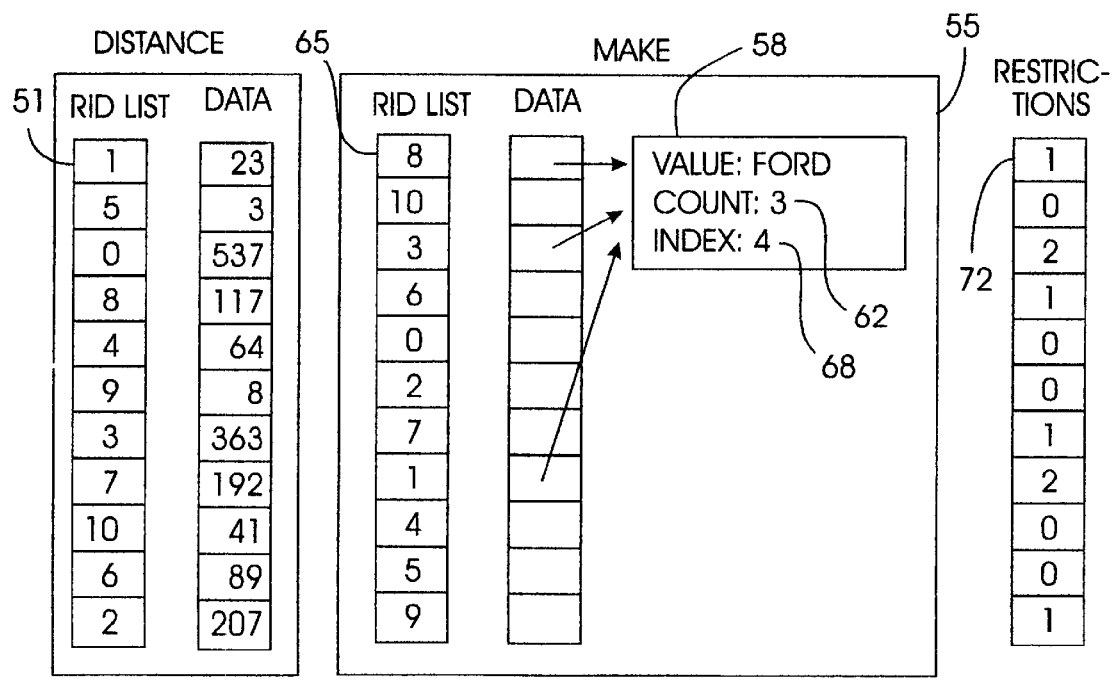
FIG. 7 is a schematic diagram of a categorical restriction data structure.
Figure 8:
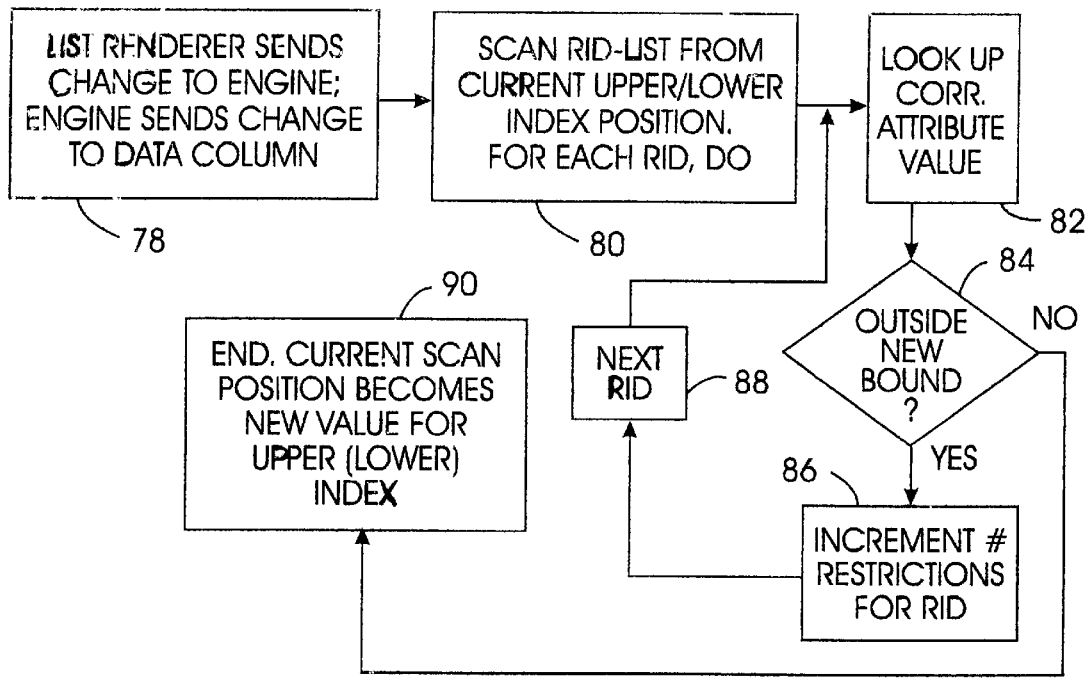
FIG. 8 is a flow chart of the logic for implementing numeric restrictions.
Figure 9:
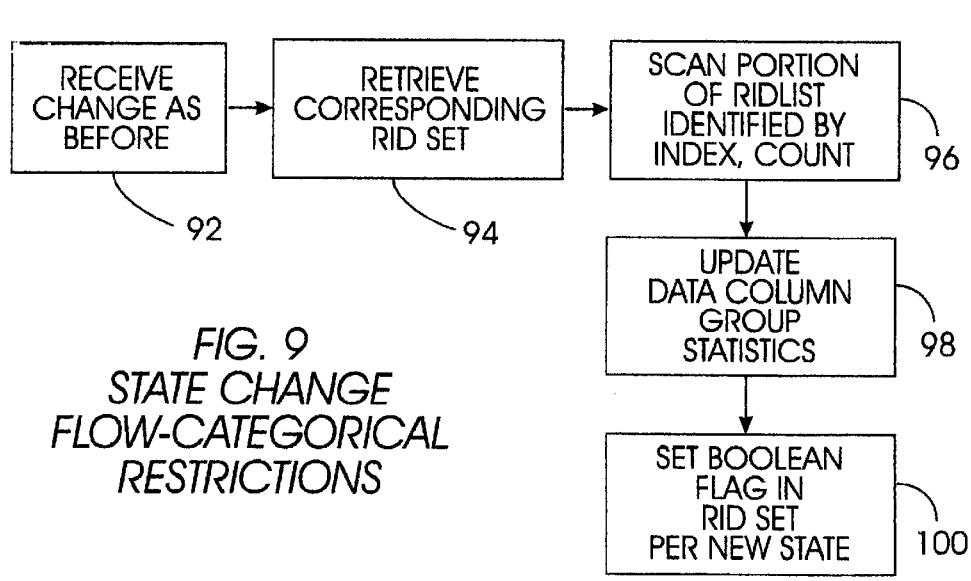
FIG. 9 is a flow chart of the logic for implementing categorical restrictions.

Having set forth the structures of the preferred data columns 51, 55, attention is now directed to FIGS. 6 and 7, which illustrate data structures for implementing query refinements, also referred to herein as restrictions, in accordance with the logic shown in FIGS. 8 and 9, it being understood that the restrictions are input by a user by means of the GUI 32 set forth above. As shown in FIG. 6, a numeric restrictions array 70 is associated with the data columns 51. Likewise, a categorical restrictions array 72 is associated with the categorical data columns 55, as shown in FIG. 7. It is to be understood that the arrays 70, 72 preferably are implemented as a single object, with FIG. 6 showing the restriction array after the numerical restriction "<100" has been applied and FIG. 7 showing the same restriction array after applying the categorical restriction "not Ford". Thus, a single restriction array is shared by all numeric data columns 51 and all categorical data columns 55.

As intended by the present invention, a restrictions array 70, 72 is an array of integers (initialized at zero), indexed by RID, that keeps track of restrictions against the associated record. In accordance with present principles, if a record's restriction count is zero, the record is unrestricted and belongs to the current results set; otherwise, it does not. When a record is restricted along an attribute, its corresponding restriction count is incremented by one, and when the user removes an attribute restriction for a record, its restriction count is decremented by one. Furthermore, as shown in, e.g., FIG. 6, the current state for attribute values in a numeric data column 51 is represented by an upper index 74 and a lower index 76 in the RID list 52.

Because, it will be recalled, the RID list 52 is sorted by attribute value, a subrange in the RID list 52 corresponds to a subrange in attribute value. A change in state indicates that either index 74, 76 or both might move. Thus, for example and in cross-reference to FIGS. 3A and 6, an initially unrestricted upper index 74 moves up to a restricted upper index 74R when a user indicates a state change of "distance<100 miles".

With the above in mind, cross-reference is now made to FIGS. 6 and 8 to understand the details of the logic for updating numeric data columns. At block 78 in FIG. 8 the list renderer 28, in response to user manipulation of the GUI 32, sends an attribute change to the engine 18, which in turn sends the changes to the appropriate data column manager 26. In response, at block 80 a DO loop is entered during which the RID list 52 is scanned from the current upper index 74 (or lower index 76, depending on the direction of the change). For each RID, the corresponding attribute value is looked up at block 82 and then compared to the new restriction at decision diamond 84. If the attribute value lies outside the new bound, the number of restrictions for that RID in the restriction array 70 is incremented by one, and then the next RID is retrieved at block 88 and the scan continued by looping back to block 82. In contrast, when the corresponding attribute value of a RID is found to be within the new bound, the logic moves from decision diamond 82 to block 90 to end the current scan and move the upper (or lower) index 74 (76) to the position of the last-tested RID. In the example shown in FIG. 6, the upper index 74 is moved to position 74R at the end of the scan pursuant to the exemplary distance restriction of "less than 100 miles".

The details of a change to a categorical data column 55 can be appreciated in reference to FIGS. 7 and 9. At block 92 of FIG. 9 a state change is received as described above, and then at block 92 the RIDset 58 that corresponds to the changed categorical attribute is retrieved. As an example, assume that the user has manipulated the GUI 32 to indicate that Ford cars are to be excluded from the results set.

Moving to block 96, the portion of the RID list 65 that is marked by the RIDset.index and RIDset.count values 68, 62 of the RIDset 55 retrieved at block 94 is scanned and compared to the new categorical restriction. The restrictions array 72 is then updated in accordance with the scan at block 98. In the example shown, two restrictions have been combined, a numeric restriction of "<100 miles" and a categorical restriction of "not Ford", and these restrictions are reflected in the restriction array 72. Then, at block 100, a Boolean flag in the RIDset 55 under test is set to indicate the new state, i.e., "restricted" or "not restricted". Note that the RIDset scheme enables examination of only those RIDs that are relevant to the restriction. It is to be understood that the processes above are essentially the same when relaxing restrictions, except that directions in scanning are reversed for numerical relaxations and Boolean flags are set appropriately for categorical relaxations.

It may now be appreciated that with the above data structures and logic, only the data for the attribute being changed by the user are examined, and only records affected by the change are examined, shortening processing time. These features arise from the present recognition that the user can adjust only one attribute at a time.

Figure 10:
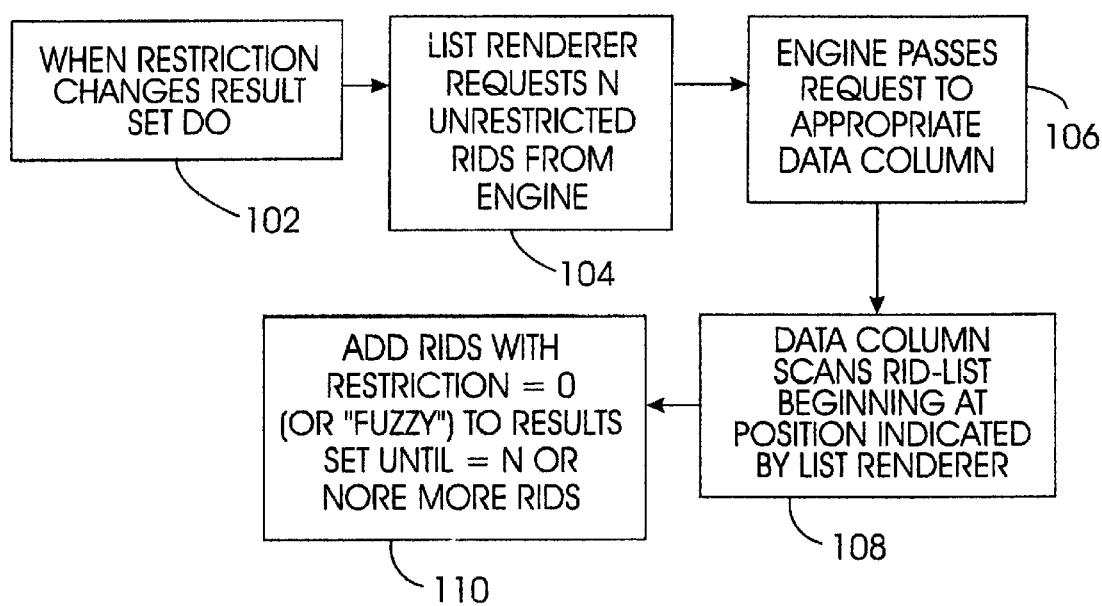
FIG. 10 is a flow chart of the logic for rendering a results set.

Moreover, the present invention recognizes that in instantiating records for display pursuant to a change, only those records that will actually be displayed are instantiated, further shortening processing time. FIG. 10 shows a preferred logic for representing this feature. Commencing at block 102, when a change is received that causes at least one record to move into or our of a results set, a DO loop is entered. Proceeding to block 104, the list renderer 28 requests N unrestricted records from the engine 18, wherein N is the number of records that can be simultaneously presented on the monitor 30.

At block 106, the engine 18 passes the request to the appropriate data column manager 26. Moving to block 108, the manager 26 scans the associated RID list beginning at a position "P" indicated by the list renderer 28. For each RID scanned, its restriction count is examined, and if it is zero the RID is added at block 110 to a list of RIDs to be returned. The loop continues until N RIDs have been added to the return list or until no further RIDs remain for processing. In the case of categorical data columns 55, if the Boolean flag of a RIDset indicates that the RIDset is restricted, the entire block of RIDs in the corresponding RID list are not scanned, further increasing processing speed. In any case, the list renderer 28 requests the records indicated by the return list, thereby instantiating only the records that will actually be displayed on the monitor 30 and, hence, further speeding processing. If desired, as indicated in block 110 "fuzzy" query borders can be implemented by relaxing the restriction threshold from zero to a higher number.

While the particular SYSTEM AND METHOD FOR WEB-BASED QUERYING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer program product including a program of instructions having:

means for receiving at least one results set from at least one source of data, the results set at least containing records characterized at least by attributes;

means for displaying at least one attribute control to a user;

means for altering at least the results set at least in response to receiving at least one user input via the attribute control, wherein the user input defines at least one numeric attribute upper or lower boundary and the means for altering generates a modified results set, the means for altering including:

numeric attribute scan means for scanning a list of records;

numeric attribute determination means for determining, for each record looked up, whether an attribute is outside the boundary;

numeric attribute incrementing means for incrementing a restriction counter for a record when the respective attribute is outside the boundary;

numeric attribute establishing means for establishing the upper or lower attribute boundary as a boundary of the modified results set in response to the means for determining; and numeric attribute return means for returning at least a portion of the modified results set in response to the means for scanning.

2. A computer program product including a program of instructions having:

means for receiving at least one results set from at least one source of data, the results set at least containing records characterized at least by attributes;

means for displaying at least one attribute control to a user;

means for altering at least the results set at least in response to receiving at least one user input via the attribute control, wherein the user input defines at least one restriction and the means for altering generates a modified results set including records, at least one record being associated with at least one restriction count, the means for altering including:

categorical attribute scan means for scanning a list of records by restriction counts; and categorical attribute return means for returning at least a portion of the modified results set in response to the means for scanning.

3. The computer program product of claim 2, wherein only records having a predetermined restriction count are displayed in the modified results set.

4. The computer program product of claim 2, wherein records having restriction counts within a fuzzy range of a predetermined variable are displayed in the modified results set.

* * * * *